United States Patent [19]
Janssen

[11] 3,938,856
[45] Feb. 17, 1976

[54] WATER COLLECTING DEVICE ASSOCIATED WITH THE SIDE WINDOW OF A VEHICLE

[75] Inventor: Lutz Janssen, Wolfsburg, Germany

[73] Assignee: Volkswagenwerk Aktiengesellschaft, Wolfsburg, Germany

[22] Filed: July 12, 1974

[21] Appl. No.: 488,009

[30] Foreign Application Priority Data
July 14, 1973 Germany............................ 2335957

[52] U.S. Cl. .................................. 296/154; 49/476
[51] Int. Cl.² ............................................ B60J 9/00
[58] Field of Search .................. 296/154, 146, 28 R; 49/476, 488, 485

[56] References Cited
UNITED STATES PATENTS

| | | | |
|---|---|---|---|
| 1,622,098 | 3/1927 | Emond | 296/28 R |
| 1,921,284 | 8/1933 | Crecelius | 296/28 R |
| 2,498,852 | 2/1950 | Doty | 49/485 |
| 3,074,754 | 1/1963 | Komenda | 49/485 |
| 3,596,980 | 8/1971 | Cadion | 296/154 |

Primary Examiner—Robert J. Spar
Assistant Examiner—Gary Auton
Attorney, Agent, or Firm—Brumbaugh, Graves, Donohue & Raymond

[57] ABSTRACT

A water collecting device for the side window of a vehicle comprises an impervious channel formed by the combination of an outer edge of a side door, an adjacent windshield column and a sealing member positioned in the space between the side door and the column. The channel is capable of intercepting water, when water is flowing from the front windshield of the vehicle towards the side window, and transferring the water downward by gravity away from the side window. An outlet is included at the lower end of the channel for discharging the water remotely from the side window.

2 Claims, 3 Drawing Figures

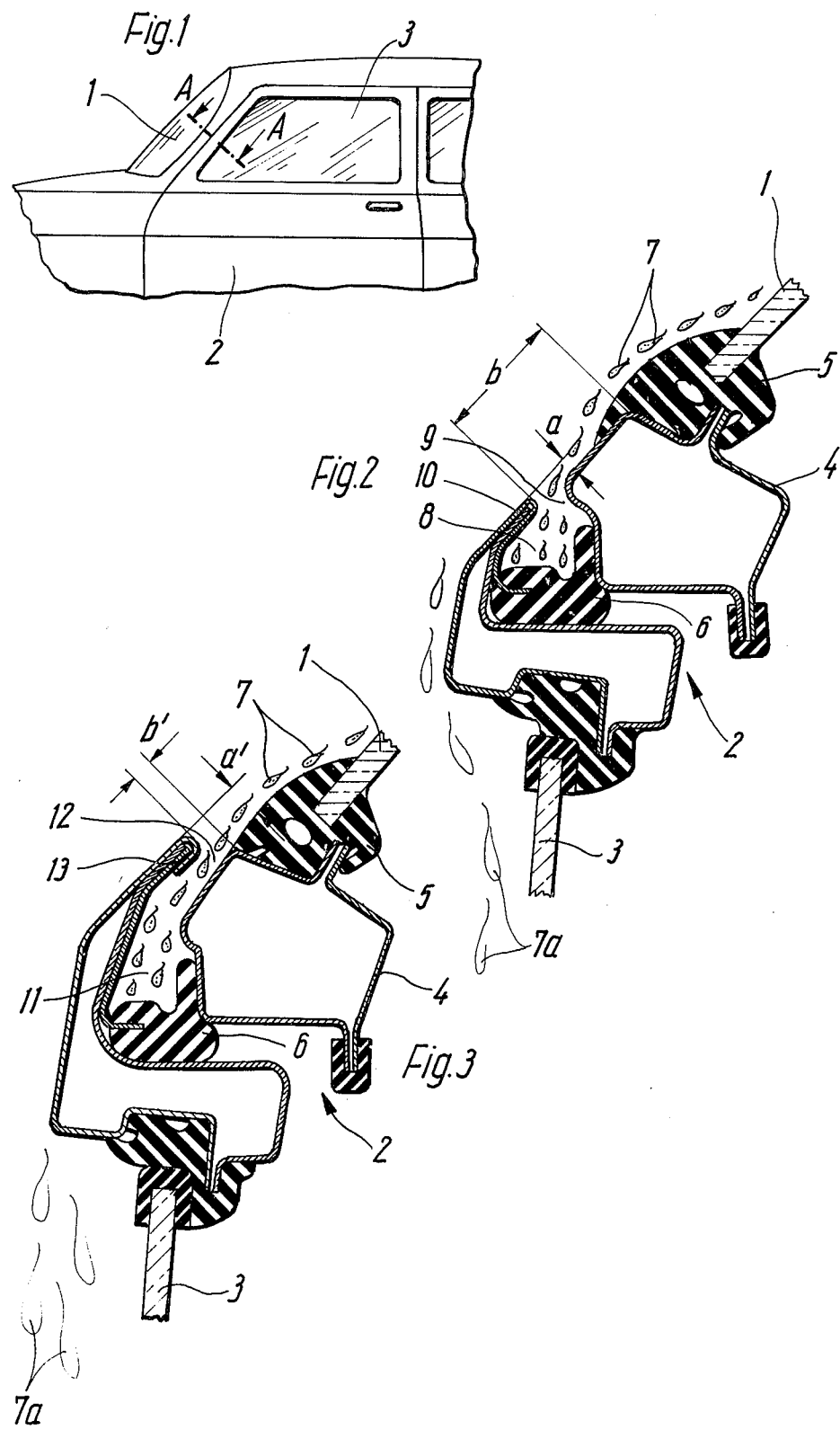

WATER COLLECTING DEVICE ASSOCIATED WITH THE SIDE WINDOW OF A VEHICLE

BACKGROUND OF THE INVENTION

The present invention relates essentially to a device for collecting water which is flowing towards a side window of a vehicle and, more pertinently, to such a device for intercepting rain or dirty water flowing off of the front windshield of a motor vehicle.

Prior art vehicular water collecting devices utilize catch channels which are incorporated into the side of the windshield, the windshield column, or the rubber sealing bordering the windshield. These catch channels usually include a front edge which protrudes outwardly from the external surface of the vehicle.

The purpose of the channels is to collect rain or other dirty water which is blown across the windshiled towards the sides of the vehicle by the force of wind resulting from the travel of the vehicle. Thus, the catch channels prevent the water from reaching the vehicle's side window panes.

Maintaining the side windows free from water is a significant safety factor. For example, in the case of motor vehicles, the soiling or wetting of the front side windows is especially undesirable because the panes must remain clear so that the side view mirror may be used without impaired visibility.

A major disadvantage of these prior art devices is that it is difficult, if not impossible, to guide the collected water downward through the channels in a predetermined path without altering the external appearance of the vehicle. Such prior art devices may prevent water, flowing laterally off of the windshield, from flowing directly onto the side windows. However, because these prior art channels usually terminate in a region adjacent the bottom portion of the side window, there exists a substantial possibility that the collected water exiting from the channels might again be forced into the vicinity of the side window pane. Yet another disadvantage is that the construction of these prior art devices requires the utilization of special components having comparatively complex shapes, e.g., a frame for the windshield must be provided with a specially constructed channel.

SUMMARY OF THE INVENTION

Thus, a principle object of the present invention is to overcome the defects of the prior art, such as indicated above.

The water intercepting device of the present invention is characterized in that the door joint, located between the front, i.e., hereinafter that direction generally corresponding to the normal direction of travel of the vehicle, windshield column and the side window, in combination with a sealing member, which is employed for waterproofing the vehicle's interior, form a catch channel. Water is conducted to the channel through a crevice or gap formed between the column adjacent the door joint and the outer door edge opposite the column. The channel is provided at its lower end with an outlet for discharging the water remotely from the side window to be protected.

Thus, in accordance with the present invention, a hollow space normally present in most vehicles, namely, the door joint immediately forward of the side window to be protected, is utilized as an essential component of the intercepting device. Since the door joint and, thus, the channel extend downwardly to the floor region of the vehicle, the present invention serves to conduct by gravity the collected rain or dirty water so that it is conveyed, unseen, to a location remote from the side window.

Additional components for the purpose of manufacturing the intercepting device of the present invention are not necessary, inasmuch as the elements forming the door joint and the seal are standard components of most vehicles. Modification of the normal door construction and, possibly but not necessarily, the cross sectional configuration of the column may be made. However, such modification is necessary only to the extent that between the column and the adjacent outer door edge there is provided a relatively narrow crevice or gap which is suitable to receive the water flowing off of the windshield. In furtherance of this object, it may be advantageous to allow the outer edge of the side door to partially project outward, away from the column, a predetermined distance, measured between the outer lateral portion of the door edge and the periphery of the column, so that the water is carried directly into the gap which extends across the direction of flow of the water.

While the embodiment of the present invention described hereinabove does not appreciably modify the external appearance of the vehicle, special stylistic possibilities are offered by another embodiment which is characterized in that the outer edge of the door laterally overlaps or covers at least a portion of the column, whereby an extended water receivng gap is formed. Thus, in the alternate embodiment the outer edge of the side door, or more precisely, the outer metal plate of the door, is forwardly extended so that it partially overlaps the column.

BRIEF DESCRIPTION OF THE DRAWING

For a further understanding of the present invention, reference may be had to the accompanying drawing, in which:

FIG. 1 is a partial side elevational view of an automobile showing the environment of the present invention;

FIG. 2 is a sectional view taken along line A—A of FIG. 1 showing one embodiment of the present invention; and FIG. 3 is a sectional view taken along line A—A of FIG. 1 showing an alternate embodiment of the present invention.

DESCRIPTION OF THE PREFERRED EMBODIMENTS

Referring now to the drawing, there is shown the front left portion of a passenger car including a windshield 1, a side door 2 and a window 3 mounted in the upper portion of the side door 2. Other components include a windshield column 4, a rubber windshield frame 5 extending between the column 4 and the windshield 1, and a resilient sealing member 6 positioned in the space between the side door 2 and the column 4 (see FIGS. 2 and 3) for waterproofing the interior of the vehicle.

Without the intercepting device of the present invention, there is a danger that rain or dirty water 7 may be driven from the windshield 1 by the wind, as indicated by 7a, towards the vicinity of the side window 3, thereby resulting in the wetting or soiling thereof. In accordance with the present invention, the water 7 is prevented from reaching the vicinity of the side window 3. This is accomplished by collecting the water in an intercepting device employing a door joint 8 (see FIG. 2) and a crevice or gap 9 which is formed by the space between the column 4 and the adjacent outer edge 10 of the side door 2. Since the door joint 8 runs the longitudinal length of the side door 2, the door joint 8 forms a downwardly extending channel which terminates in an outlet (not shown) at the floor of the vehicle. Significantly, the outlet is utilized for discharging the downwardly flowing water remotely from the side window 3.

Referring specifically to FIG. 2, the outer door edge 10 projects outward, away from the column 4, by a predetermined distance $a$, measured between the outer lateral portion of the door edge 10 and of the column 4. Accordingly, the gap 9, formed between the outer door edge 10 and the column 4, opens outward substantially perpendicular to the direction of flow of the water 7 flowing off of the windshield 1. This distance $a$, like the distance $b$, measured between the front edge of the outer door edge 10 and the front edge of the column 4, is determined experimentally for each vehicle so that optimum design dimensions may be attained.

Referring now to FIG. 3, there is shown an embodiment wherein a door joint 11 is also used as a discharge channel for water intercepted by a downwardly extending gap or crevice 12. However, in this embodiment, the outer door edge 13 is extended forward a sufficient distance so that it laterally covers at least a portion of the column 4.

As is evident from the drawing, the pertinent distance $b'$, measured from the front edge of the column 4 to the front edge of the outer door edge 13, is considerably less than the distance $b$ in the embodiment shown in FIG. 2. Moreover, it is apparent that the distance $a'$, measured between the outer lateral portion of the door edge 13 and the periphery of the column 4, is greater than the distance $a$ of the embodiment shown in FIG. 2. It will be understood that the ability of the arrangement to catch or collect the rain or dirty water 7 is dependent upon the design dimensions of the outer door edge 10 and 13, respectively.

Whereas, in accordance with the embodiment shown in FIG. 2, the gap 9 is externally visible when the door is closed, the outer door edge 13 of the embodiment shown in FIG. 3 covers the gap 12 so that it cannot be readily seen. Thus, the embodiment shown in FIG. 3 offers an attractive stylistic alternative to the embodiment shown in FIG. 2.

It will be understood that the above described embodiments are merely exemplary and that persons skilled in the art may make many variations and modifications without departing from the spirit and scope of the invention. All such modifications and variations are intended to be included within the scope of the invention as defined in the appended claims.

I claim:

1. In a vehicle comprising a front windshield capable of being contacted by water, a column adjacent said windshield for the mounting thereof, a side door located laterally rearward of said column and having an outer edge adjacent said column, said side door and said column forming a joint therebetween, a side window arranged in said side door and occupying a first elevational position, and a sealing member positioned in said joint for preventing passage of water therethrough; the improvement wherein said outer edge of said side door projects substantially outward, away from said column, by a predetermined distance from the outermost periphery of said column, wherein said outer edge of said side door, and said column and said sealing member are dimensioned so as to form an impervious channel, having an opening extending across the direction of flow of water which would normally flow rearwardly and laterally from the windshield onto the side window of the door, for intercepting water when water is flowing from said windshield rearwardly and laterally towards said side window, for transferring intercepted water downward away from said side window; and wherein said channel has a lower end occupying a second elevational position lower than said first elevational position of said side window, said lower end terminating at an outlet for discharging water remotely from said side window.

2. The device of claim 1, wherein said outer edge of said side door laterally covers at least a portion of said column.

* * * * *